United States Patent [19]

Fry

[11] 4,294,326
[45] Oct. 13, 1981

[54] WHEEL SUPPORT ASSEMBLY

[75] Inventor: Timothy S. Fry, Dunchurch, England

[73] Assignee: GKN Group Services Limited, England

[21] Appl. No.: 94,023

[22] Filed: Nov. 14, 1979

[30] Foreign Application Priority Data

Nov. 15, 1978 [DK] Denmark .............................. 5073/78

[51] Int. Cl.³ .............................................. F16H 3/44
[52] U.S. Cl. ..................................... 180/255; 308/168
[58] Field of Search ................. 180/253, 254, 255, 75, 180/252; 308/168, 172, 86, 164, 165; 74/467, 801, 785; 301/122

[56] References Cited

U.S. PATENT DOCUMENTS

| 2,551,973 | 5/1951 | Schuck | 308/172 X |
| 3,150,532 | 9/1964 | Bixby | 180/75 X |
| 3,192,000 | 6/1965 | Williams | 308/168 X |
| 3,295,624 | 1/1967 | Lee et al. | 180/255 |

Primary Examiner—Joseph F. Peters, Jr.
Assistant Examiner—Randall A. Schrecengost
Attorney, Agent, or Firm—Merriam, Marshall & Bicknell

[57] ABSTRACT

A motor vehicle wheel support assembly, with a stationary casing, a stub axle for a road wheel supported within the casing by thin-walled bearing liners, a thrust plate carried by the axle and engaged by thrust washers in the casing to take axial loads, and a reservoir above the bearing liners from which lubricant is delivered to the liners. Lubricant collects in a sump at the bottom of the casing and is returned to the reservoir by being impelled by the thrust plate.

5 Claims, 1 Drawing Figure

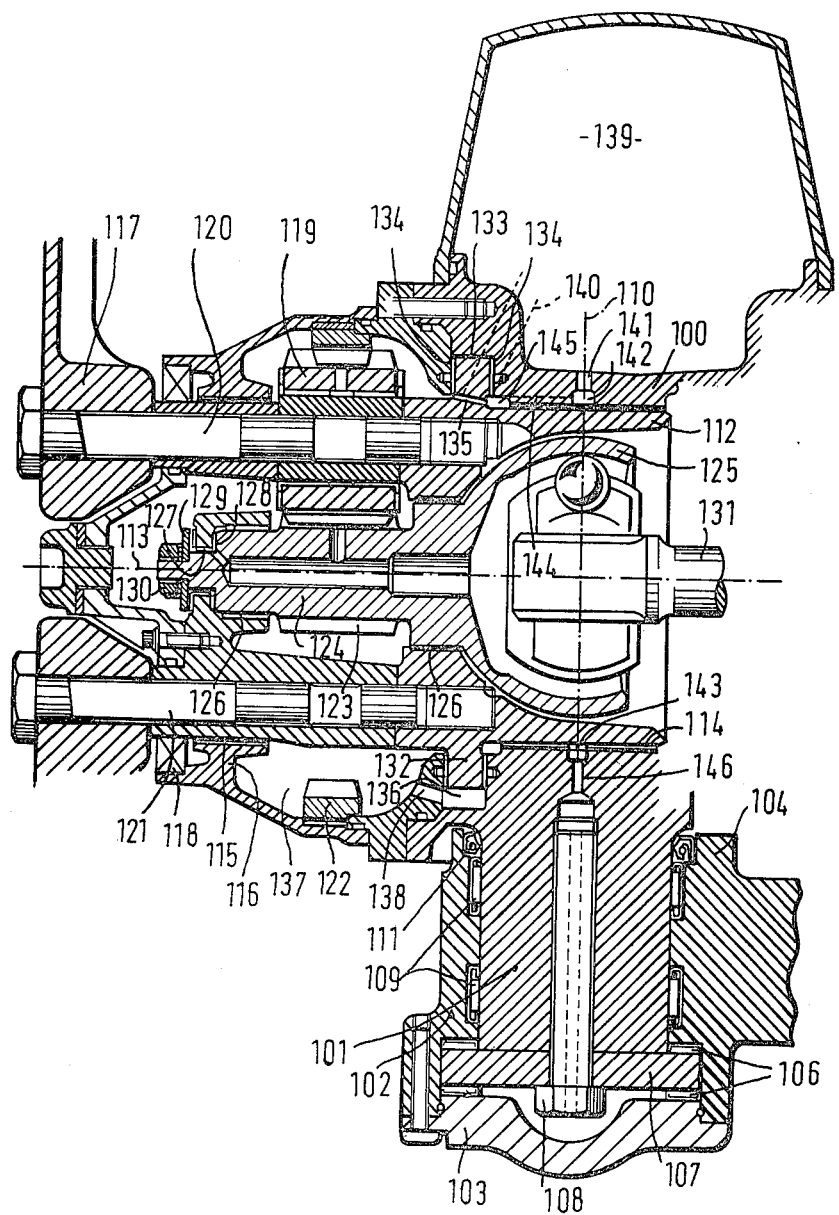

WHEEL SUPPORT ASSEMBLY

BACKGROUND TO THE INVENTION

Field of the Invention

This invention relates to an assembly for supporting a road wheel of a motor vehicle.

The generally accepted practice for motor vehicles is, for those wheels which are not driven, to have a stub axle on which a hub is mounted by ball or roller bearings. In the case of wheels which are driven, it is usual to have stationary hubs or casings in which are mounted rotatable axles, again by ball or roller bearings. Whilst such arrangements are satisfactory in performance, ball and roller bearings are expensive and are comparatively bulky.

It is an object of the present invention to provide a motor vehicle wheel support assembly which utilises plain bearings in place of ball or roller bearings commonly used, and which includes an efficient lubrication system to obtain satisfactory performance from the plain bearings.

SUMMARY OF THE INVENTION

According to the invention, we provide a motor vehicle wheel support assembly, comprising a casing connected to a suspension component of the vehicle, a stub axle connected to a road wheel of the vehicle, at least one thin walled bearing liner within the casing receiving the stub axle with a bearing clearance, a thrust plate carried by the axle, thrust washer means carried by the casing and engaging the thrust plates for constraining relative axial movement between the axle and casing, a reservoir for lubricant above said bearing liners, means for delivering lubricant from said reservoir to said bearing liners, and means for returning lubricant to said reservoir upon rotation of said axle.

The provision of the reservoir for lubricant, from which the lubricant is fed to the thin wall bearing liners and subsequently returned to the reservoir is effective to ensure proper lubrication of the bearing liners.

The means for returning lubricant to the reservoir may utilise the thrust plate as an impeller, the thrust plate being received in an annular groove which has a radial clearance from the thrust plate over a lower part of its periphery, the casing affording a sump from which lubricant is supplied to the clearance part of the groove and a passage extending from the upper part of the groove to the reservoir. When the thrust plate rotates with the stub axle lubricant is transferred from the sump to the reservoir.

DESCRIPTION OF PREFERRED EMBODIMENTS

The invention will now be described by way of example with reference to the accompanying drawing, which is a longitudinal cross section through a wheel support assembly according to the invention.

Referring to the drawing, there is shown a motor vehicle wheel support assembly which includes a stationary hub or casing and a rotatable stub axle. The assembly comprises a casing 100 in the general form of a hollow cylinder, provided with a downwardly depending spigot 101. The spigot 101 is received in a cup 102 with a removable bottom plate 103, formed on the end of a suspension member 104 of a motor vehicle. A thrust bearing with races 106 and a thrust plate 107 secured to spigot 101 by a hollow bolt 108, and roller bearings 109, provide for steering movement of the casing 100 about a vertical axis 110. An oil seal 111 is provided within the top of the cup 102, and engages a cylindrical surface at the top of spigot 101.

The casing 100 receives a stub shaft member 112. The member 112 is mounted within the casing 100, for rotation about axis 113, by two thin-walled bearing liners 114, which coincides with the steering axis 110, and bearing liners 115, received in a cylindrical formation on the inside of a web 116 at the forward end of the casing 100. The member 112 carries at its forward end the centre 117 of a road wheel of the vehicle, and an oil seal 118 is operatively positioned between the casing 100 and member 112 at this end.

The member 112 also forms the planet carrier of a planetary reduction gear, the member 112 having three radially extending apertures in each of which is disposed a planet gear wheel 119 rotatably received on a shaft 120 extending longitudinally of member 112 and intersecting the apertures. The member 112 is of two part construction, and the shafts 120 are appropriately screw-threaded to act as bolts to hold the member together, there being six such shafts three of which (as shown at 121) do not extend through windows in the member. An annulus gear 122 is fixed within the casing 100, and a sun gear 123 is provided on an extension 124 of the outer member 125 of a constant velocity universal joint, the extension 124 being rotatably mounted within the member 112 by thin-walled bearing liners 126 and axially located within such member by a thrust bearing 127 in member 112, running between a shoulder 128 on extension 124 and a collar 129 secured thereto by a nut 130. The constant velocity joint has its centre about which it can accommodate bending movement coincident with the steering axis 110, and provides for transmission to the planetary reduction gear from an input shaft 131. The reduction gear as above described is thus of the type in which the planet carrier constitutes the output member, the wheel centre 117 rotating the member 112.

The member 112 is provided with a radially outwardly extending circular thrust plate 132, which is received in a groove 133 formed in the casing 100, thrust washers 134 being provided in such groove on either side of the thrust plate. A plurality of circumferentially spaced inclined apertures 135 are provided to extend axially through the thrust plate 132. In the upper region of the casing, extending over about 90° of arc, the outer circumferential wall of groove 133 is a close fit to the circumference of the circular thrust plate 132, whilst over the remainder of the periphery of groove 133 the groove wall has a clearance from the thrust plate. This is shown in part at 136 at the bottom of the casing 100. The lower region of the casing 100 at the annulus gear 122 is formed as a sump 137, and a passage 138 extends therefrom into the lower part of groove 133.

An enclosure 139 is provided at the top of the casing 100 and this provides a reservoir for lubricant. Two inclined passages 140 extend upwardly into the reservoir from the groove 133 at the points of transition of such groove from being a close fit to the thrust plate 132 to having a clearance therefrom. The effect of this is that when the thrust plate 132 is rotating it will act as an impeller to impel lubricant which enters clearance space 136 in groove 133 by way of passageway 138 to flow up into the reservoir, and as there are two passageways 140 this effect will apply for either direction of rotation of the thrust ring.

A passage 141 extends downwardly from the base of the oil reservoir, and opens into an annular chamber 142 surrounding the bearing liner 114. A hole 143 in the bottom of the bearing liner 114 provides for feed of lubricant from the annulus 142 to the bearing surface of the liner. A groove 144 extends horizontally from annulus 142, and provides for feed of lubricant into a further annular chamber 145 from which the lubricant can lubricate the thrust washers 134 and pass through passageways 135 in the thrust plate 132. A bore 146 extends downwardly from the bottom of annulus 142, to allow lubricant to enter the hollow bolt 108 and fill the cup 102 to lubricate the bearings which provide for steering movement of the assembly. This lubricant is retained by seal 111.

In use, lubricant which enters the annulus 142 passes upwardly through hole 143 to lubricate the bearing liner 114, downwardly through bore 146 to lubricate the steering swivel bearing arrangement as above described, and along the groove 144 to lubricate the thrust bearing arrangement and pass through passageways 135. From passageways 135, the lubricant reaches the annulus gear 122, and by being thrown and by the action of planet gears 119 is brought inwardly to lubricate the bearing liners 126 and the sun gear 123. Such lubricant also accumulates between web 116 and seal 118, and lubricates bearing liner 115. Lubricant falling to the sump 137 at the bottom of casing 100 is returned by passage 138 to the clearance 136 around the thrust plate 132, and is returned by the rotation thereof to the oil reservoir as above described.

The invention thus provides a hub incorporating planetary reduction gearing, with a considerable saving of space accomplished by the use of thin wall bearing liners, an adequate lubrication system being provided to ensure that such bearing liners perform satisfactorily.

Although not specifically illustrated above, sealing means would of course be provided at the inboard end of the assembly, to prevent escape of lubricant. For example, a flexible gaiter or boot may be used to close the end of the member 112, relative to the shaft 131, and a running seal may be provided between member 112 and 100.

Alternative arrangements of the thin wall bearing liners and thrust plate and washers could also be utilized, for example by the disposition of the thrust plate and washers inboard or outboard of both bearing liners or in various combinations.

Further, although as described the wheel support assembly is one incorporating planetary reduction gearing for drive of the vehicle wheel, thin walled bearing liners as described may be incorporated in an assembly with a rotary stub axle and a stationary casing which does not incorporate any provision for drive. In such a case, the assembly would merely comprise a casing and a stub axle, with thin walled bearing liners in the casing and a thrust plate and thrust washers for axial location of the stub axle. The assembly could incorporate means for lubrication as described above in relation to the driven version, and could be steerable or non-steerable.

The particular arrangement of the bearing liner 114 is relative to the steering axis 110, and the support of the universal joint outer member 125 in the assembly, provide for accurate centering of the universal joint relative to the steering axis and thereby desirable working conditions for such joint. The bearing liners by which the universal joint outer member is supported relative to the stub axle member 112 would provide a relatively great radial clearance, to allow the sun gear 123 to align itself relative to the planet gears 119.

I claim:

1. A motor vehicle support assembly, comprising a casing connected to a suspension component of the vehicle, a stub axle connected to a road wheel of the vehicle; at least one thin walled bearing liner within the casing receiving the stub axle with a bearing clearance; a thrust plate carried by the axle; thrust washer means carried by the casing and engaging the thrust plate for constraining relative axial movement between the axle and casing; a reservoir for lubricant above said bearing liners; means for delivering lubricant from said reservoir to said bearing liners; and means for returning lubricant to said reservoir upon rotation of said axle;

said means for returning lubricant to said reservoir comprising said thrust plate; means defining an annular groove in which said thrust plate is received, said groove having a radial clearance from said thrust plate over a lower part of the periphery thereof; means defining a sump in said casing and means for supplying lubricant from said sump to said clearance part of said groove; and means defining a passage from an upper part of said groove to said reservoir, whereby rotation of said thrust plate impels lubricant from said groove to said reservoir by way of said passage.

2. An assembly according to claim 1, further comprising an input shaft and gearing within the casing providing for drive from said input shaft to said stub axle, and means for supplying lubricant from the reservoir to said gearing.

3. An assembly according to claim 2, wherein said input shaft includes a universal joint, said universal joint being supported in said stub axle by further thin-walled bearing liners.

4. An assembly according to claim 1, further comprising bearing means between said casing and suspension components providing for steering movement of said casing about a steering axis, a thin-walled bearing liner having its centre on said axis.

5. An assembly according to claim 4, wherein said bearing means is disposed below said bearing liners and there is means for supplying lubricant to said bearing means.

* * * * *